United States Patent Office 2,837,749
Patented June 10, 1958

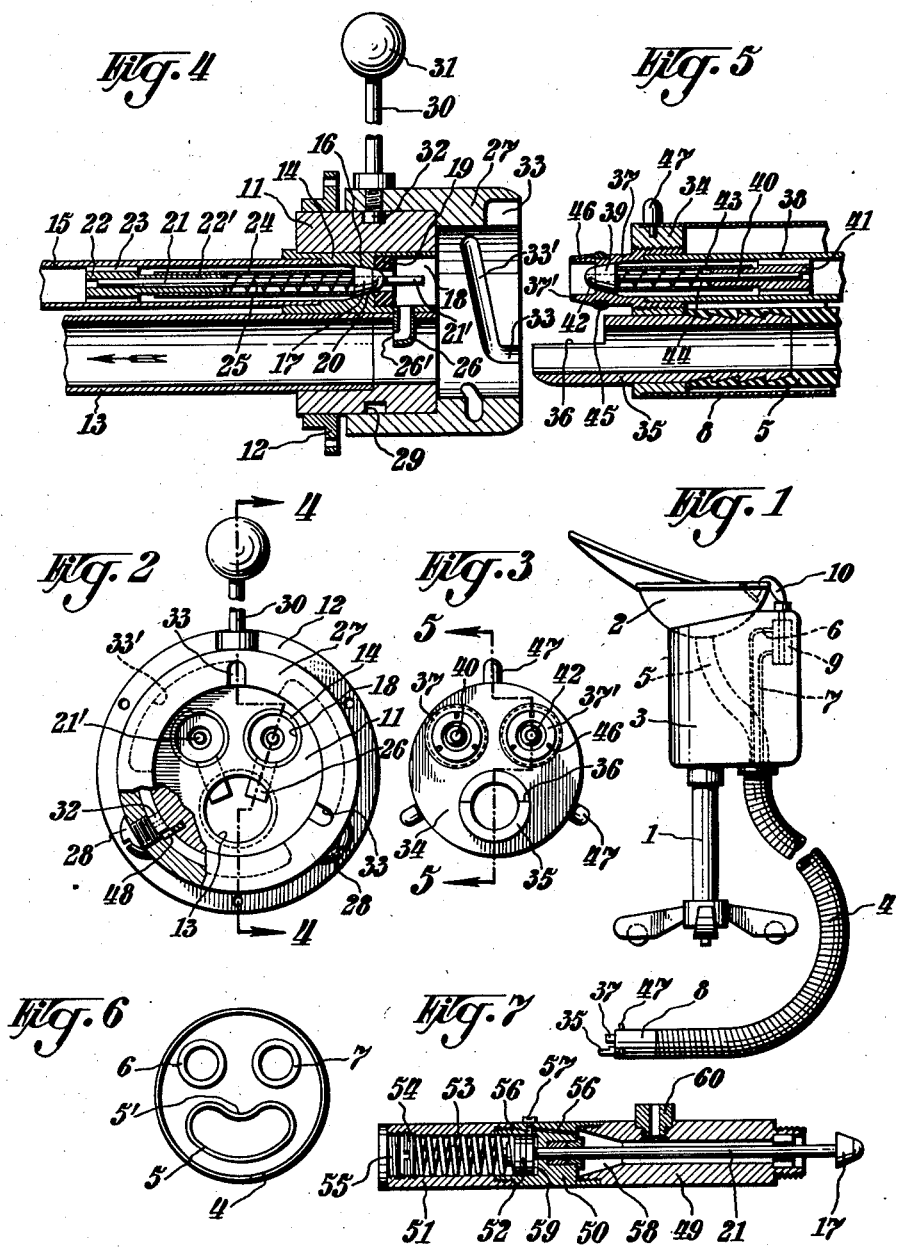

2,837,749

MULTIPLE WATER PIPE CONNECTING DEVICE

Lothar Gross, Stuttgart, Wurttemberg, Germany

Application July 22, 1954, Serial No. 445,147

6 Claims. (Cl. 4—159)

For washing the hair of the human head in the bent back position of the head, the so-called rearward washing, the hairdresser makes use of a movable stand which is provided with a wash basin and which is connected by a movable water pipe to a stationary fitting. A feature of the invention is that the discharge pipe and the supply pipes for cold and hot water are combined into one unit, which is detachably connectable as a whole to the stationary fitting into which the corresponding stationary pipes discharge. The stationary fitting, which is permanently connected to a discharge pipe laid in the building and to one or two supply pipes for cold and hot water, can be disposed, for example, in a wall, and also in a partition between two cubicles of a hairdressing salon.

The detachable connection can also be effected according to a further feature of the invention by a connecting head at the end of the unit, which connecting head is pressably engaged by connecting means against the stationary fitting, while the fitting and, if desired, the connecting head are equipped with valves, which automatically open and close when the connection is made and opened respectively. The invention provides for a rapid connection which permits the simultaneous connecting and opening of the three pipes required by simple manipulation.

A further feature of the invention is that the space situated in the stationary fitting in front of the closing valve of each pipe is situated above the discharge pipe and communicates with said discharge pipe. This has the advantage that any drips of water occurring can immediately flow off into the discharge pipe. In the stationary fitting there engages the connecting head, which is connected to the movable pipes and which is so formed that the above-mentioned space in the stationary fitting comes into communication with outer air on uncoupling before the connecting head has been completely withdrawn from the fitting. By this ventilation of the space in question there is ensured the discharge at the proper time of any water collecting in this space.

The spring loading of the valve in the connecting head can be smaller than the spring loading of the valve in the stationary fitting. This has the advantage that on connecting or coupling of the connecting head, the valve in the connecting head opens before the valve for the supply pipe under pressure in the stationary fitting.

The closing valves can be conveyed by sleeves connected thereto on central attachments of radial guide pieces, while the valve path can be limited by the adjoining of the sleeves to the guide pieces. In order that the valves close true in the pressure pipes, provision can be made for a throttle arrangement which brings about a delayed closing of the valves.

Regarding the further features of the invention reference is made to the description hereinbelow and the claims.

An exemplified embodiment of the invention is illustrated in the drawing wherein:

Figure 1 shows a movable stand with a wash basin and a movable pipe unit;

Figures 2 and 3 show front views of the stationary fitting and of the movable connecting head;

Figure 4 shows a vertical section according to the broken line A—B in Figure 2;

Figure 5 is a vertical section through the connecting head according to the broken line C—D in Figure 3;

Figure 6 shows a cross section on an enlarged scale through the pipe unit in Figure 1; and Figure 7 shows in section and enlarged view a supply pipe connectable to the stationary fitting and having built in delaying arrangement.

Figure 1 shows a wash basin 2 disposed on a mobile stand 1, said wash basin being mainly used in hairdressing salons for rearward washing of the human hair. To the stand or its housing 3 there is connected a movable pipe unit which consists, for example, of a metal hose 4 in which are located the discharge pipe 5 coming from the wash basin 2 and the two pipes 6, 7 for cold and hot water. The hoses or pipes 4, 5, 6, 7 are connected to the movable connecting head 8, 34. Inside the housing stand 3 the supply pipes 6, 7 for cold and hot water are connected to a mixer 9, which is in connection with a movable hand spray 10. Since it is quite immaterial for the invention whether there are available two pipes for cold and hot water or only one pipe for mixed water, and since the two pipes illustrated in the drawing are of the same shape, only one pipe will be mentioned at a time in the description hereinbelow for the sake of simplicity.

The stationary fitting according to Figures 2 and 4 consists of a cylindrical body 11, which can be provided with a flange 12, with the aid of which the body 11 can be fastened, for example to a wall. In the body 11 of the fitting there is inserted at the bottom the discharge pipe 13, which passes by way of a siphon not illustrated in the drawing over to the house discharge pipe. Above the discharge pipe 13 a sleeve 14 is placed firmly in the body 11, to which sleeve the supply pipe 15 is firmly connected. The sleeve 14 has inside a conical valve seat 16 for the conical closing valve 17. Following the valve seat 16 the sleeve 14 enlarges into the cylindrical chamber designated 18, at the bottom of which is disposed a packing 19. The closing valve 17 is held fast by a semi-spherical nut 20 on the central valve rod 21, which is slidably led in a guide piece 22 of radial construction fastened in the supply pipe 15. Between the star-shaped arms of the guide piece 22 there are provided the channels indicated by 23 for the passage of water. The guide piece 22 has a central attachment 22' whereon a sleeve 24 is slidably led, which is firmly connected to the valve body 17. On the valve rod and inside the sleeve 24 there is disposed a compression coiled spring 25 which is clamped between the valve 17 and the guide piece attachment 22'. The valve rod 21 extends with an extension 21' projecting beyond the nut 20 into the sleeve chamber 18. The chamber 18 is connected at the bottom to the discharge pipe 13 by a short angular piece of pipe 26. As is evident from Figure 4, the mouth 26' of the pipe 26 is situated in the direction of discharge.

It should be mentioned here that the stationary fitting described is advantageously fastened somewhat against the horizontal when being mounted, so that the discharge water can flow off in the direction of the arrow drawn in in Figure 4.

On the body 11 of the fitting a ring 27 is rotatably disposed, which is held fast in the axial direction in that screws 28 screwed into the ring 27 from the outside engage in an annular groove 29 which extends round the body 11. One of the screws is formed into the handle 30 which can be provided at its free end with a knob 31. On the screws 28, 30, small rollers 32 can be disposed inside the annular groove 29, in order to prevent friction. The ring 27 has internally three angular grooves in the example illustrated. Each of these grooves has an axially running part 33 adjoining which is an inclined part 33', as is clear from Figure 4.

In the cylindrical connecting head 34 seen in Figures 3 and 5, consisting essentially of a plate, there is firmly inserted at the bottom a discharge union 35 to which is connected a flexible discharge pipe 5 of rubber or a suitable synthetic plastic. The union 35 is provided at the top with a recess 36, in which the small angular discharge pipe 26 of the stationary fitting engages on connection or coupling.

Above the discharge union 35 a sleeve 37 is firmly connected to the connecting head 34, in which sleeve a pipe length 38 is firmly inserted from the rear, to which one of the flexible tubes 6 or 7 seen in Figure 1 is connected. In the internal, conical valve seat of the sleeve 37 there engages the conical closing valve 39 which is conveyed by its valve rod 40 in the star-shaped guide piece 41 of the pipe 38. On the outer end of the valve rod 40 a semi-spherical nut 42 is disposed to hold the valve 39 fast. The valve 39 also passes through a sleeve 43 connected thereto on a central attachment of the guide piece 41. Moreover, a compression coiled spring 44 is disposed inside the sleeve 43 on the valve rod 40. An annular packing ring 45 surrounds the free end of the sleeve 37. The sleeve 37 ends externally in a cylindrical or sligthly conical rim 37', which is externally provided with a small groove 46 extending longitudinally.

In the connecting head 34 there are screwed radially from outside three bolts 47 in the example illustrated, which serve simultaneously to retain the casing 8 seen in Figure 1, to which the metal hose 4 or the like is connected.

To connect or couple the movable pipes, the connecting head is inserted in the stationary fitting, in which case the discharge union 35 engages in the discharge pipe 13 and the sleeve 37, 37' in the space 18 of the sleeve 14, while the packing 45 brings about the temporary closing of the space 18. At the same time the bolts 47 enter the axial groove parts 33 of the ring 27. The final connection is effected by rotation of the ring 27 with the aid of the handle 30, 31. The connecting head is also drawn into the stationary fitting by the obliquely running groove parts 33', while the sleeve rim 37' is pressed against the packing 19 in the chamber 18. At the same time the two closing valves 17, 39 are opened and in the following manner: the extension 21' of the valve rod in the stationary fitting strikes against the valve rod 40 of the connecting head, whereby first the valve 39 in the connecting head is moved backward and opened, for the spring 44 acting upon this valve is weaker than the spring 25 working upon the valve 17. The opening path of the valve 39 is limited by adjoining of the sleeve 43 to the guide piece 41. At this moment the valve rod 21, 21' is pushed back and the valve 17 thereby opened, so that now the water under pressure can flow out of the supply pipe 15 into the pipe 38 of the connecting head and thus into the flexible pipe 6 or 7. The path of the valve 17, too, can also be limited by connection of the sleeve 24 to the guide piece 22.

If two supply pipes are present, both supply pipes are simultaneously brought into connection with one another.

On opening or uncoupling, the ring 27 of the stationary fitting is turned in the reverse direction, whereby the outward movement of the connecting head is effected by way of the pins 47, the connecting head then being withdrawn by hand from the stationary fitting. On uncoupling the valve 17, the stationary fitting closes first, so that no more water can flow out of the supply pipe 15 which is under pressure. Following this the valve 39 also closes in the connecting head. If any water flows into the space 18 during this time, this water can flow off through the pipe 26 into the discharge pipe 13, so that no drips fall on to the floor of the hairdressing salon. In order to ensure that the drips do flow back, the grooves 46 in the sleeve 37 of the connecting head are present, through which outside air can enter the space 18 as soon as the packing 45 is released from the walls of the space 18. By the mouth 26' of the piece of pipe 26, which runs in the direction of discharge, it is further ensured that drips do get to the discharge pipe 13.

In order to limit the rotation of the ring 27, there can be provided in the body 11 a set-screw 48 (Figure 2), which lies inside the annular groove 29 and which cooperates with one of the rollers 32.

It should finally also be mentioned that to the discharge pipe 5 inside the casing 4 may be imparted the cross section evident from Figure 6, in order to utilize to advantage the inner space. The walls 5' of the discharge pipe 5 facing the two flexible pipes 6, 7 can be made flat or, as shown in Figure 6, concave.

A too rapid and spasmodic closing of the valve 17 can be avoided, if it cooperates with a delaying or throttle arrangement. Figure 7 shows in longitudinal section a supply pipe constructed in this manner, which is connectable to the stationary fitting. The valve rod 21 bearing the valve 17 passes in a housing which, in the example illustrated, consists of the three parts 49, 50, 51. The part 49 of the housing is insertable or screwable into the sleeve 14 of the stationary fitting, exactly like the supply pipe 15 in Figure 4, so that the said parts are also mutually interchangeable. The end of the valve rod 21 opposite the valve 17 bears a piston 52, which is disposed in the part 51 of the housing, which serves as a cylinder. In this cylinder there is disposed a compression coiled spring 53, which on the one hand presses on the piston 52 and on the other hand is controllably supported on a nut 54 screwed into the part 51 of the housing. The part 51 of the housing is tightly sealed at the rear by a cover 55. In the middle part 50 of the housing, which is centrally penetrated by the valve rod 21 which is sealed off by a gland, there is a channel 56, which can itself act as a throttle or which engages in the throttle screw 57 which is screwed into the part 50 of the housing. The channel 56 leads from the internal chamber 58 of the part 49 of the housing to the cylinder chamber 59, which is formed by the piston 52 and the part 50 of the housing. The supply pipe under pressure is connected to the union 60, which opens into the chamber 58 of the part 49 of the housing.

In Figure 7 the parts are shown in the position they occupy when the valve 17 is closed. When the valve 17 opens, in the manner described above, the piston 52 together with the valve rod 21 is pushed back, while water under pressure enters the cylinder chamber 59 through the channel 56 as soon as the channel opening is opened by the retreating piston 52.

When the valve 17 closes, the piston 52 is moved forward by the compression coiled spring 53, which comes into the position of the coiled spring 25 seen in Figure 4. Said closing movement is delayed, since the piston 52 has to push the water present in the cylinder chamber 59 through the channel 56. A slow, steady closing of the valve 17 is thereby ensured. The magnitude of the delay can be adjusted by rotation of the throttle screw 57. The delaying or throttling arrangement described could naturally also be otherwise formed.

I claim:

1. In a washing apparatus, the combination, with a stationary fitting having a body and two water supply conduits and a waste conduit connected thereto, of a transportable basin, two flexible water supply pipes and a flexible waste pipe leading from said basin and assembled as a unit, a ring rotatable on said fitting body and having an end portion thereof extending beyond said body to form a socket, a plurality of grooves on the inner peripheral face of said ring socket portion, each groove having an axial entrance part and an inclined part, a head on the free end of said pipe unit engaged within said ring socket, a plurality of external radial projections on said head engaged within the ring socket grooves thereby to removably attach the head to the fitting body first by relative axial movement of said head and body and then by rotational movement of said ring relative to said head and body, a valve in the body connected to each supply conduit, a valve in the head connected to each supply pipe, interengaged means on each supply conduit valve and the corresponding flexible supply pipe valve for holding the valves open when the head and body are coupled and means on each of the valves for biasing each valve to the closed position when the head and body are uncoupled whereby each supply and waste conduit communicates with the corresponding pipe when the head and body are coupled.

2. Washing apparatus as claimed in claim 1, wherein the supply conduit valves are guided in seating sleeves in the fitting body, said sleeves each providing a socket chamber in advance of the valve, each of the flexible supply pipes having a portion projecting from the flexible pipe unit head thereby to enter one of said socket chambers upon attachment of said head to said body, a sealing ring in each of said socket chambers engageable by the projecting portion of the corresponding flexible supply pipe, a sealing ring on each flexible supply pipe projecting portion engageable with the peripheral surface of the corresponding socket chamber, and at least one air-relief groove in the external surface of each flexible supply pipe projecting portion.

3. Washing apparatus as claimed in claim 1, wherein the supply conduit valves are guided in seating sleeves in the fitting body, said sleeves each providing a socket chamber in advance of the valve, each of the flexible supply pipes having a portion projecting from the flexible pipe unit head thereby to enter one of said socket chambers upon attachment of said head to said body, the supply conduits being located above the waste conduit and a drip pipe being provided leading from each of said socket chambers into said waste conduit, the discharge ends of said drip pipes opening in the waste discharge direction.

4. Washing apparatus as claimed in claim 1, wherein radially inwardly directed projections on the ring engage in a peripheral groove in the fitting body, said ring carrying an actuating handle and an abutment in said groove to limit rotational movement of the ring by engagement with said projections.

5. In a washing apparatus, the combination, with a stationary fitting having two water supply conduits and a waste conduit connected thereto, of a transportable basin, two flexible water supply pipes and a flexible waste pipe leading from said basin and assembled as a unit, a head on the free end of said pipe unit, means on said head engageable with means on said fitting by which the head is removably attachable to the fitting with said flexible supply and waste pipes coupled to the corresponding conduits of said fitting, a normally closed spring-loaded valve for each supply conduit, a piston connected with each said valve and movable in a cylinder, a normally closed spring-loaded valve for each flexible supply pipe, the supply conduit valve springs being stronger than the flexible supply pipe valve springs, each flexible supply pipe valve being engageable, upon attachment of said head to said fitting, with one of the supply conduit valves thereby to first open the flexible supply pipe valves and then to open the supply conduit valves and thus establish communication between each supply conduit and the corresponding flexible supply pipe, and a member having a small area bore through which water is admitted from each supply conduit to said cylinders when the supply conduit valves are opened, said bores throttling the discharge of water from said cylinders and thus return movement of the supply conduit valves to the closed position when said head is disconnected from said fitting.

6. Washing apparatus as claimed in claim 5, wherein the area of each bore is adjustable by means of a set screw.

References Cited in the file of this patent

UNITED STATES PATENTS

| | | |
|---|---|---|
| 154,020 | Clotworthy | Aug. 11, 1874 |
| 1,121,146 | Steel | Dec. 15, 1914 |
| 1,245,873 | Cole | Apr. 19, 1917 |
| 1,562,979 | Muend | Nov. 29, 1925 |
| 1,828,500 | Mahoney | Oct. 20, 1931 |
| 2,531,802 | Boyer | Nov. 28, 1950 |
| 2,628,850 | Summerville | Feb. 17, 1953 |
| 2,706,646 | Olson | Apr. 19, 1955 |